(12) United States Patent
Thomas et al.

(10) Patent No.: US 6,525,721 B1
(45) Date of Patent: Feb. 25, 2003

(54) COLOR PROFILE MANAGEMENT AND COLOR COLLECTION MANAGEMENT, NAVIGATION AND VISUAL DESIGN

(75) Inventors: Karen H. Thomas, Macedon, NY (US); Jay A. Glaspy, Jr., Rochester, NY (US); Raju Seetharam, West Henrietta, NY (US); Thomas M. Sheehan, Rochester, NY (US); Sue Quinion, East Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/565,880

(22) Filed: May 5, 2000

(51) Int. Cl.[7] .............................. G06F 3/14; G06K 15/00
(52) U.S. Cl. ...................... 345/341; 345/854; 345/770; 345/594; 345/604; 358/518; 358/1.9
(58) Field of Search .................................. 345/841, 853, 345/810–813, 770, 854, 808–809, 825, 843, 779, 772–773, 840, 589–591, 593–594, 600, 603–604; 358/1.9, 1.13, 518, 523

(56) References Cited

U.S. PATENT DOCUMENTS

| | | | |
|---|---|---|---|
| 4,979,031 A | * 12/1990 | Tsuboi et al. ........... | 358/518 X |
| 5,579,446 A | * 11/1996 | Naik et al. ............. | 358/1.9 |
| 5,710,872 A | * 1/1998 | Takahashi et al. .......... | 358/1.9 |
| 6,044,173 A | * 3/2000 | Kumada ................ | 358/518 X |
| 6,157,735 A | * 12/2000 | Holub .................. | 358/1.9 X |
| 6,351,320 B1 | * 2/2002 | Shin .................... | 358/1.9 |

OTHER PUBLICATIONS

International Color Consortium®—Specification ICC.1:Sep. 1998 / *File Format for Color Profiles*, 1998.

\* cited by examiner

*Primary Examiner*—Raymond J. Bayerl
(74) *Attorney, Agent, or Firm*—Fay, Sharpe, Fagan, Minnich & McKee, LLP

(57) ABSTRACT

A color manager high level navigation system comprising a graphical user interface, a color manager selection icon at the highest navigation level of the graphical user interface and a color manager further comprising a view menu, a characterization tool icon for activating a profile characterization tool and a profile list window. The view menu includes a filter selection that causes all available profiles to be displayed, a filter selection that causes only destination profiles to be displayed, a filter selection that causes only source profiles to be displayed, a filter selection that causes only device gray source profiles to be displayed, a filter selection that causes only device RGB source profiles to be displayed, a filter selection that causes only device CMY source profiles to be displayed and a filter selection that causes only device CMYK source profiles to be displayed. The profile list window includes a list of available profiles matching a filter criteria selected from the view menu, a message box for displaying confirmation of recent actions and a profile to media button for activating a profile to media assignment dialog. The profile list window further comprises a column displaying an icon for each profile that is characterized as a system profile that cannot be deleted or modified, a column displaying a symbolic name of each profile, a column displaying a type for each profile including, a column displaying a color space type for each profile, a column displaying a description of each profile and a text display box displaying a current default output profile symbolic name.

20 Claims, 14 Drawing Sheets

COLOR PROFILE MANAGEMENT AND COLOR COLLECTION MANAGEMENT, NAVIGATION AND VISUAL DESIGN

BACKGROUND OF THE INVENTION

This invention is directed to a graphical and interactive user interface for user collection and management of color profiles used in a common controller for full color IOTs.

Increasingly affordable and available computer controlled color printing and reproduction systems will promote wider use of color in document-intensive industries or document-intensive functional areas of enterprises. Using color effectively in environments that support diverse color systems to produce color display and printed materials requires reducing the complexity of color specification collection and management in order to maintain an easy to use, efficient and productive environment for both the management user and the end user submitting data for printing in a networked environment.

Some color specification systems utilize a device dependent color classification model which provides color descriptor classifications that are derived from, and which control, associated physical devices. Such device dependent color classification models include the additive red, green, and blue (RGB) color model used to physically generate colors on a color monitor, and the subtractive cyan, magenta, and yellow, plus black (CYMK) color model used to put colored inks or toners on paper. These models are not generally correlated to a human color perceptual model. This means that these device dependent color models provide color spaces that treat color differences and changes in incremental steps along color characteristics which are useful to control the physical devices but which are not validly related to how humans visually perceive or describe color. Furthermore, considerable trial and error may be required to select a specific color or to achieve a desired color modification because the color model and its color space representation is not uniform to the user, and a large change in one or more of the physical descriptors of the color space, such as in the R, G, or B dimensions, will not necessarily result in a correspondingly large change in the perceived color, Other color models exist which are representations of color, based on the human perceptual attributes of hue, saturation, and value (or brightness or lightness) dimensions (HSV). While providing some improvement over the physically based RGB and CMYK color models, these color specifications are conveniently formulated geometric representations within the existing physically based color models, and are not psychophysically validated perceptually uniform color models.

A uniform color space, based on an underlying uniform color model, attempts to represent colors for the user in a way that corresponds to human perceptual color attributes that have been actually measured. Using a device independent and uniform color model as a basis for specifying and manipulating color provides a foundation for more user control, accuracy, and precision in color selection and editing, since color specification is not tied to the physical characteristics of a particular color rendering device. One such device independent color specification system is that developed by the international color standards group, the Commission Internationale de l'Eclairage (the "CIE"). CIE color specification employs device independent "tristimulus values" to specify colors and to establish device independent color models by assigning to each color a set of three numeric tristimulus values according to its color appearance under a standard source of illumination as viewed by a standard observer. Each set of X, Y, and Z tristimulus values represents a color according to its spectral power distribution, as a summation of the color contributions of all wavelengths within the spectral distribution of a color sample, corrected for the light source used to illuminate the colored sample and for the color sensitivity of the standard observer. The CIE has recommended the use of two approximately uniform color spaces for specifying color: the CIE 1976 (L*u*v*) or the CIELUV color space, and the CIE 1976 (L*a*b*) color space (hereafter referred to as "CIELAB" space or "LAB" space).

Color profiles provide color management systems with the information necessary to convert color data between native device color spaces and device independent, uniform color spaces. For example, the International Color Consortium specification ICC.1:1998-09 divides color devices into three broad classifications: input devices, display devices and output devices. For each device class, a series of base algorithmic models are described which perform the transformation between color spaces.

The complexity and quantity of underlying color models, and the need to accurately reproduce colors on a wide variety of media, directly impacts the complexity of color collection and management user interfaces. Prior art graphical user interface systems have generally consisted of pull-down menus in which the color collection and management features have been accessible only after navigating several layers deep into the menu system. These systems have generally been non-intuitive for both the interface user and the end user who needs to know which color profile to select for accurate color reproduction on the selected output media.

Accordingly, there is a need in the art for an improved graphical user interface system for color profile collection and management for full color IOTs.

SUMMARY OF THE INVENTION

A method and graphical user interface system are provided for color profile collection and management on the controllers for full color IOTs. In one embodiment of the present invention, the system comprises a graphical user interface having a color manager selection icon at the highest navigation level of the graphical user interface. The highest level contains a pathway bar that is always available, even at lower navigational levels, with selection icons for the most frequently performed tasks, including color management. A printer status window is also always displayed in another area of the graphical user interface so the interface user can, at all times, observe any printer fault messages being displayed and the status of the currently printing job.

When the color manager icon is selected, a color manager is opened that includes a view menu and a characterization tool icon for activating a profile characterization tool and a profile list window. The view menu includes filter selections permitting the user to selectively view only specific categories of color profiles installed on the system. The default filter selection causes all available profiles to be displayed while there are other filter selections to display only destination profiles, source profiles, device gray source profiles, device RGB source profiles, device CMY source profiles and device CMYK source profiles.

The profile list window displays a list of available profiles matching the filter criteria selected from the above described view menu. The profile list window contains columns for displaying a symbolic name of the profile, type, color space, white point and, importantly, a description of the profile. The symbolic name must be unique and will later be assigned to one or more output media in a one-to-many relationship. The one-to-many relationship is used advantageously when there are, for example, several brands of similar media for which a given profile will perform satisfactorily. The symbolic names can be chosen to be descriptive names of the corresponding input or output device or medium, making it easier for the user to assign the correct color profile to a given output medium. The profile list window also includes a column displaying an icon for each color profile that is characterized as a system profile that cannot be deleted or modified and a message box for displaying confirmation of recent actions.

A right mouse button menu is available to the user for each row, or color profile, in the profile list window. The right mouse button menu provides necessary functionality for managing the color profiles, permitting the user to modify profile properties, for the currently hi-lighted profile, replace a profile, delete a hi-lighted profile, export a profile to an archival type output device, load a profile from an archival type input device, import multiple profiles from an archival type input device, print the current view and save the current view.

The present invention also provides for managing profile to media assignments. A profile to media assignment dialog includes columns for displaying emulation type, stock name, color, white point, weight, coating, opacity and, most importantly, a symbolic color profile name. All of the columns, except the symbolic name column, comprise a media definition pertaining, for example, to one type of paper. The symbolic name may also be assigned to the other media in a one-to-many relationship as describe above. A view filter.is provided permitting the user to display, besides all assignments, only emulation profile assignments, only specific stock name profile assignments, only specific stock color profile assignments, only specific stock white point profile assignments, only specific stock weight profile assignments, only specific stock coating profile assignments, only specific stock opacity profile assignments and only access profile assignments.

The profile to media assignment dialog also includes a profile to media assignment list box further including a list of available profile to media assignments matching the aforementioned filter criteria. The list includes columns displaying emulation type, stock name, color, white point, weight for each profile to media assignment, coating, opacity and symbolic name of the assigned profile.

A right mouse button pull-down menu is also provided for assignment functions for the currently highlighted row in the list of available profile to media assignments further comprising a delete assignment dialog activation, a modify assignment dialog activation, an export assignment dialog activation, a create assignment dialog activation, a print current assignment listing activation and an import assignment dialog activation.

A first advantage of the present invention is the availability of color profile collection and management functions at the highest level of the graphical user interface.

Another advantage of the present invention is the ability to apply descriptive symbolic names to each color profile, as opposed to the less descriptive filenames typical of prior color management systems.

Still another advantage of the present invention is the ability to add descriptive text to industry standard ICC color profiles thus facilitating accurate management and use of the color profiles.

Still further advantages of the present invention will become apparent to those of ordinary skill in the art upon reading and understanding the following detailed description of the preferred embodiment.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

Figure 1:
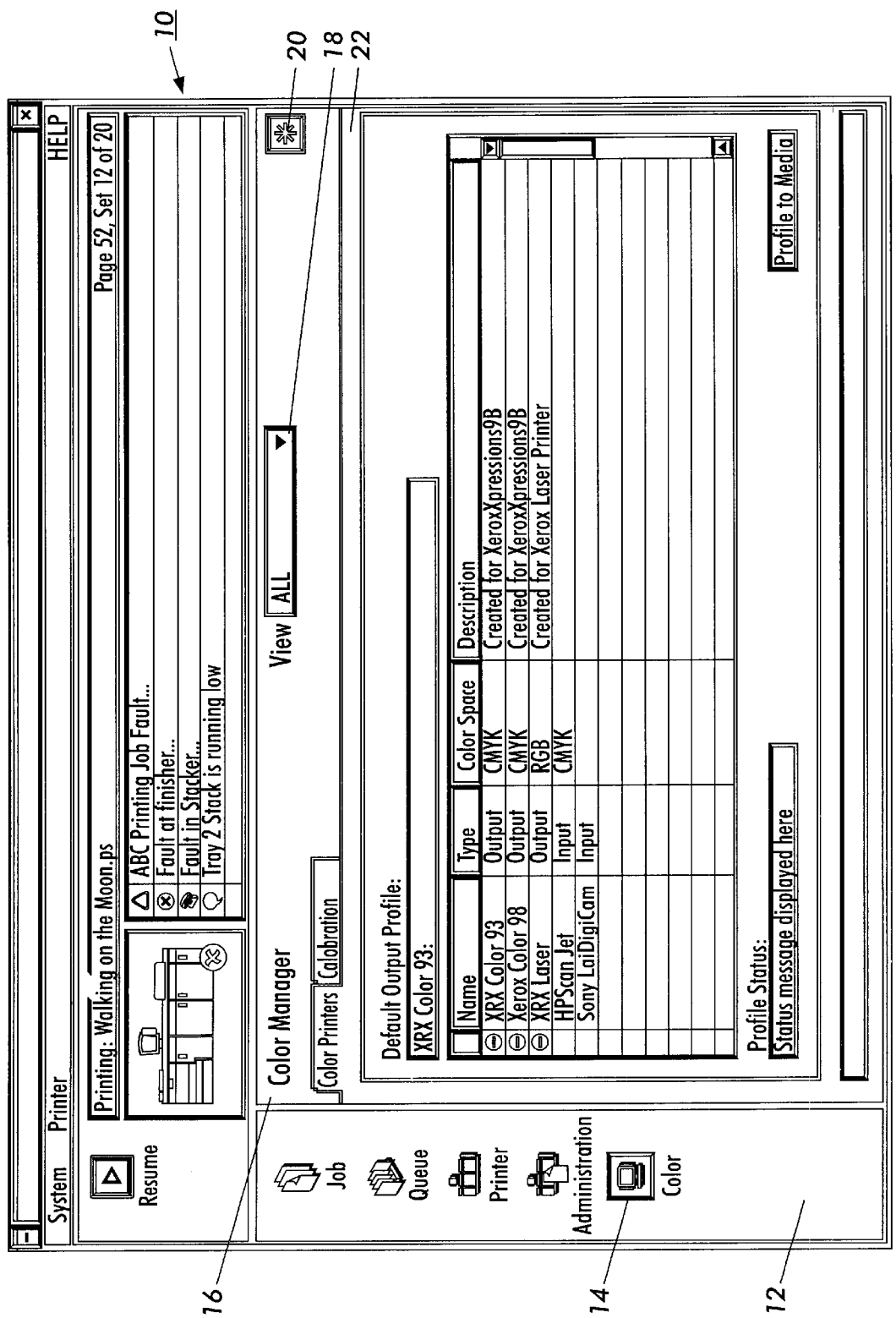
FIG. 1 illustrates a graphical user interface system of the present invention with a color manager opened and a color profiles tab selected.

Referring now to the drawings which are provided for illustrating the preferred embodiments of the invention only and not for purposes of limiting same, FIG. 1 provides a view of an exemplary graphical user interface 10 to which the present invention is directed. Of course, other configurations may also have the present invention applied thereto.

The graphical user interface 10 contains a pathway bar 12, at the highest level of the graphical user interface, on which a color manager icon 14 is found. Selecting this icon with a mouse, keyboard or other pointing device activates a color manager 16. Within the color manager 16 is a view pull-down menu 18, a characterization tool icon 20 and a color profile list window 22.

Figure 2:
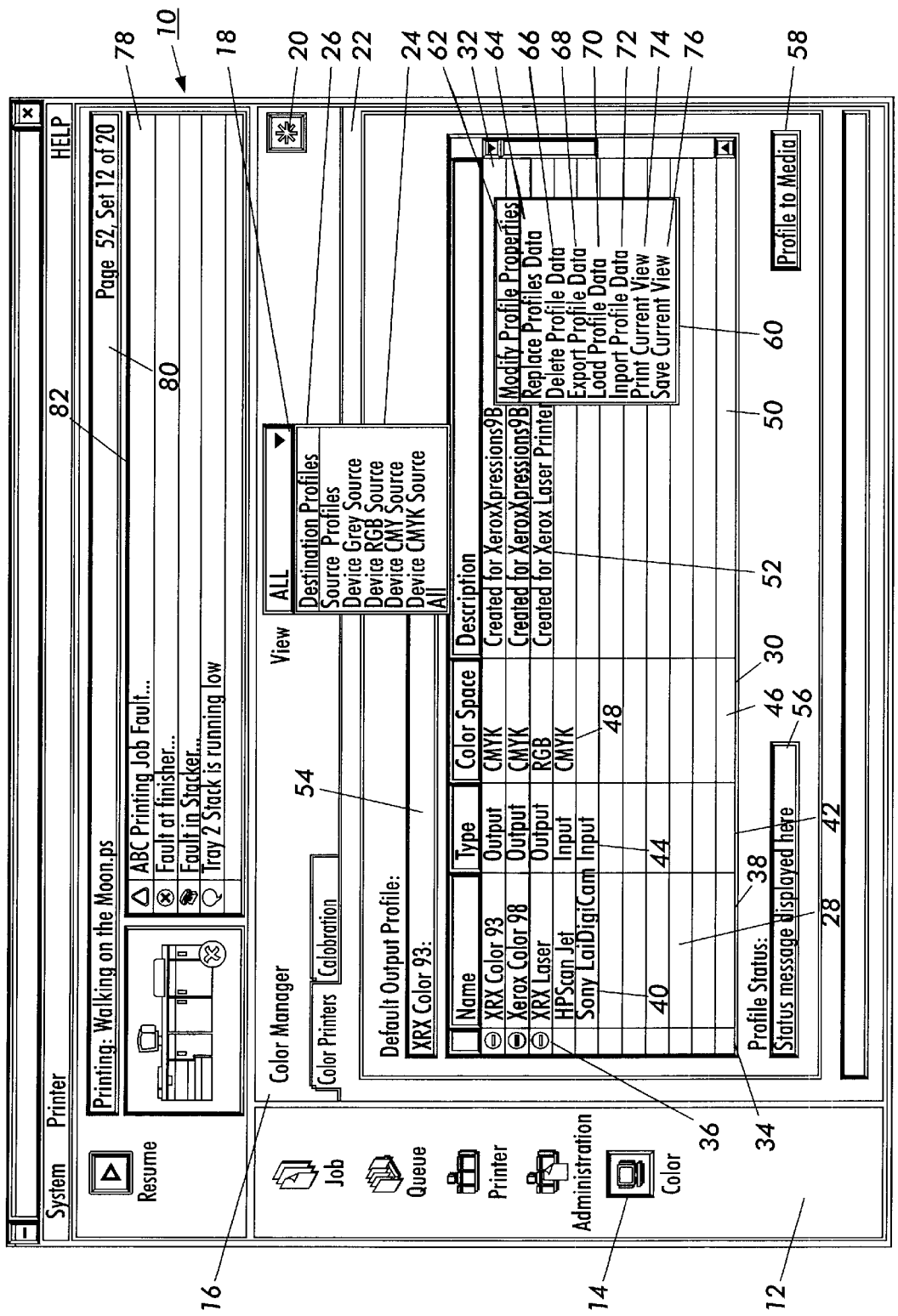
FIG. 2 illustrates the graphical user interface system of FIG. 1 with an open view menu and an open right mouse click menu.

With reference to FIG. 2, and with continuing reference to FIG. 1, where like-numbered numerals identify similar graphical interface elements, the color profile list window 22 and other elements are explained in more detail. The view pull-down menu 18, when selected, provides a list of selectable view filters 24. A default view filter 26 displays all available color profiles 28 in a profile list 30. Exemplary view filters available in the view pull-down menu 18, besides the default filter, are filters for displaying only destination profiles, source profiles, device gray profiles, device RGB profiles, device CMY profiles and device CMYK profiles. Color profiles such as color profiles 28 provide color management systems with the information necessary to convert color data between native device color spaces and device independent color spaces. For example, the International Color Consortium specification ICC.1:1998-09 divides color devices into three broad classifications: input devices, display devices and output devices. For each device class, a series of base algorithmic models are described which perform the transformation between color spaces.

Profile list 30 consists of a columnar display, where each row 32 represents an available color profile 28, with an icon column 34 which contains an icon 36 if the color profile is a system-provided profile that cannot be modified or deleted. Other columns in the profile list 30 are a symbolic name column 38 containing a symbolic name 40 by which the profile is referenced by users, a profile type column 42 containing various type identifiers 44 such as input and output, a color space column 46 with various color space identifiers 48 such as, but not limited to, gray, RGB, CMY and CMYK, and a description column 50 with descriptions 52 of the corresponding color profiles 28. The symbolic name 40 is a particularly useful feature of the present invention, making color profile 28 referencing for management and selection by end users much more convenient than the traditional filenames used by prior art color management systems.

Additional components of the color profile list window 22 consist of a text display box 54 that shows the current default output profile 28 symbolic name 40, a message box 56 that displays confirmation of recent actions, a profile-to-media button 58 for activating a profile to media assignment dialog which will be explained in detail in conjunction with FIG. 9, and a pull-down or right mouse button menu 60 that is activated: for the currently hi-lighted profile 28 which was hi-lighted by any one of several well known means such as mouse selection, keyboard selection and pointing device selection. The pull-down or right mouse button menu 60 includes a number of selection options, such as a modify properties dialog selection button 62, a replace dialog selection button 64, a delete selection button 66, an export dialog selection button 68, a load dialog selection button 70, an import dialog selection button 72, a print current view selection button 74 and a save current view selection button 76. Each dialog will be discussed in further detail in the following discussion.

Another feature of graphical user interface 10 is a status area 78 which displays a current status in message box 80, and also displays any fault information in fault list window 82. In this way, the printer user, not shown, can easily observe current status 78 and any printer faults in window 82 while performing color profile management and navigation.

Figure 3:
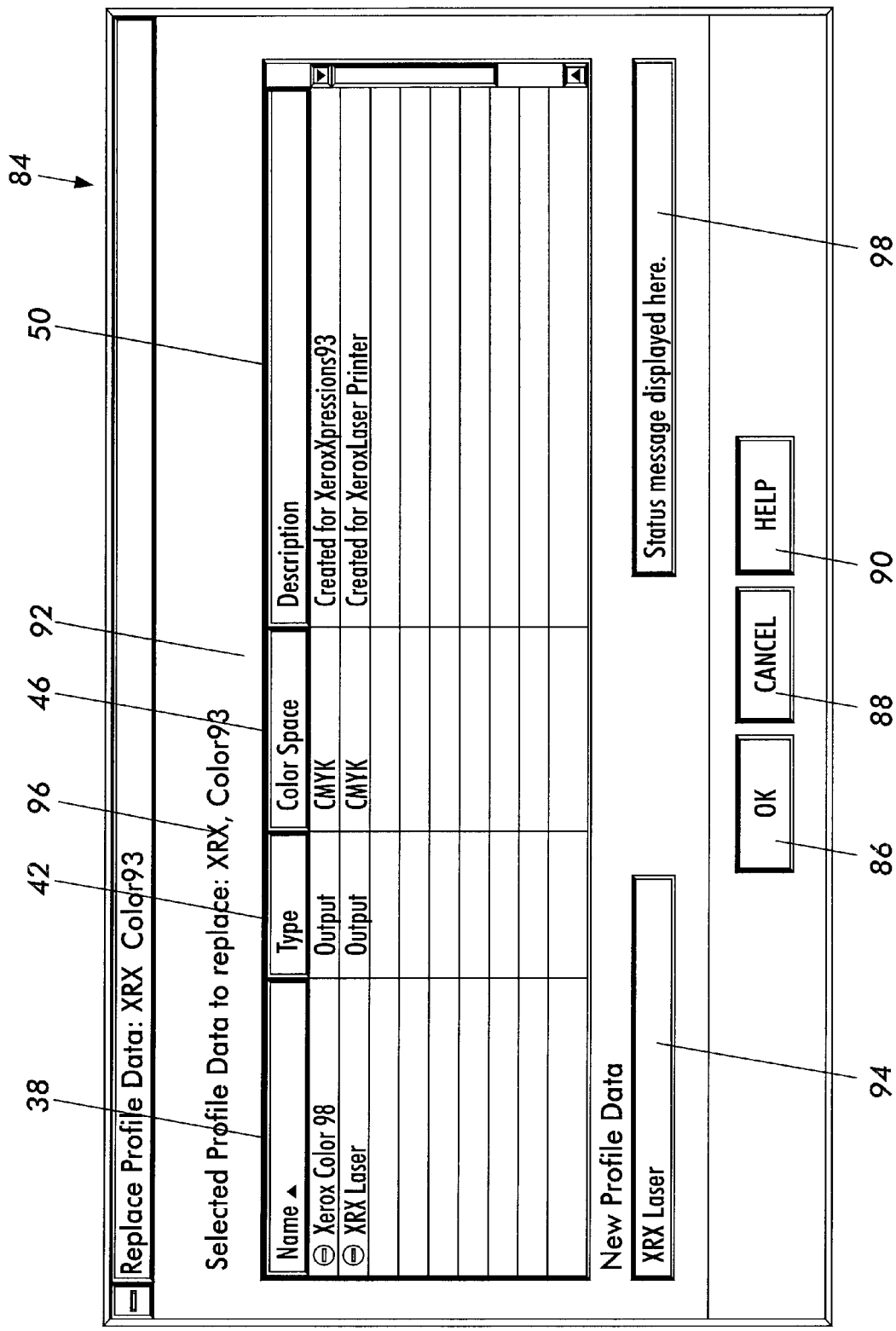
FIG. 3 illustrates a replace profile data dialog.

With reference now to FIG. 3, and continuing reference to FIG. 2, an aspect of navigation with respect to the replace dialog selection button 64 is explained. When the replace dialog selection button 64 is selected, a replace profile data dialog 84 window is opened. Within dialog 84 are the usual navigation buttons found in most graphical user interfaces, including an OK button 86 for confirming an action to be taken, a Cancel button 88 for canceling the dialog 84 and a Help button 90 whereby the user may obtain helpful instructions. These buttons appear in most dialogs and will not be discussed further unless their function is unique with respect to the dialog being discussed.

The profile data dialog 84 window also includes a list box 92 displaying a list of profiles 28 that are compatible with a previously hi-lighted profile 28. The list box 92 contains the symbolic name column 38, the profile type column 42, the color space column 46 and the description column 50 which provides the necessary information for the user to select a profile with which to replace the previously hi-lighted profile. Text display box 94 will show the symbolic name 40 of the profile selected in list box 92 that is destined to replace the previously hi-lighted profile, whose symbolic name 40 is shown as text display 96, when the OK button 86 is selected. A status message 98 will consequently display progress information.

Figure 4:
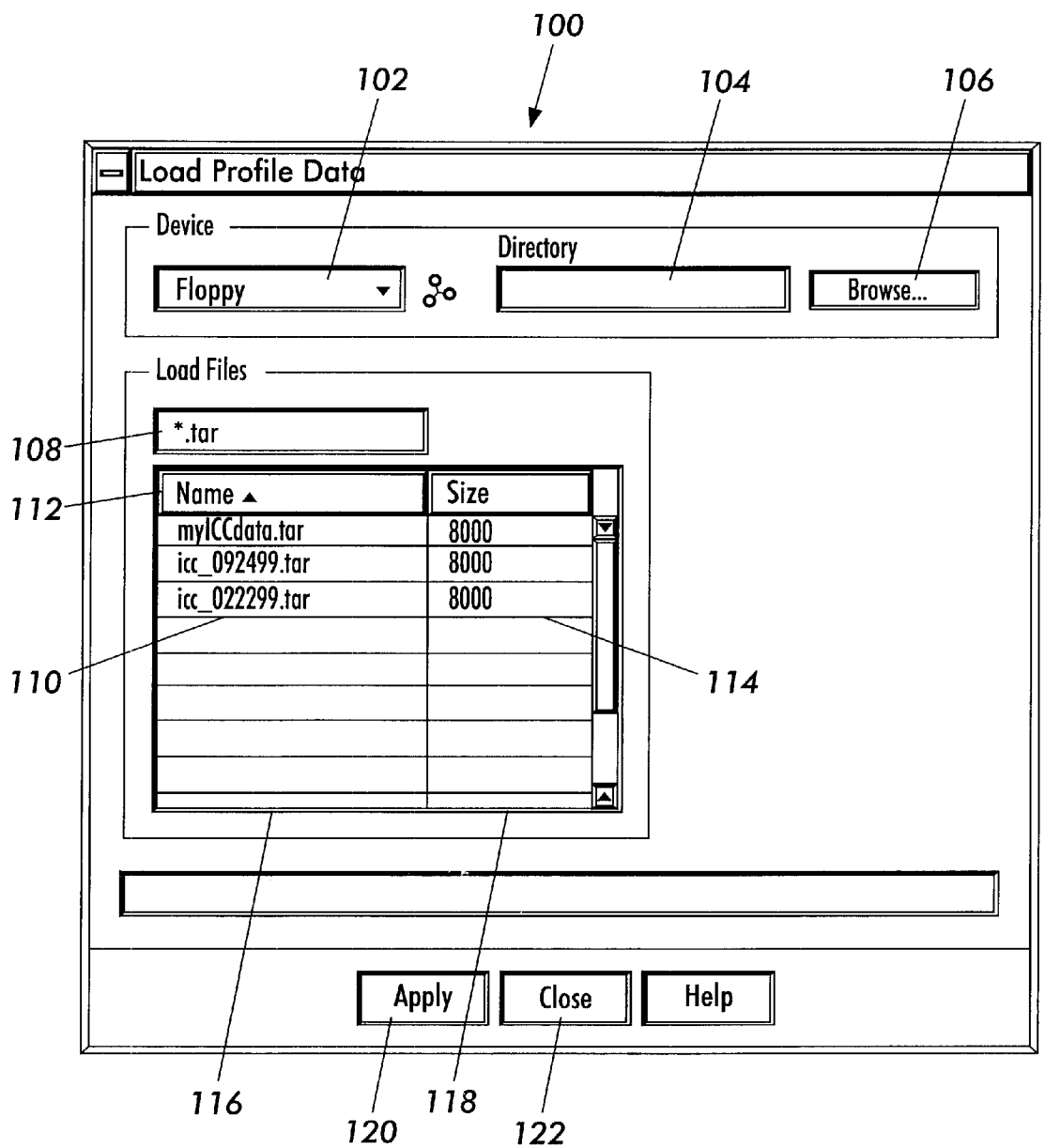
FIG. 4 illustrates a load profile data dialog.

With reference now to FIG. 4, and continuing reference to FIG. 2, another aspect of navigation with respect to the load dialog selection button 70 is explained. When the load dialog selection button 70 is selected, a load profile data dialog 100 window is opened. Within dialog 100 is an input device selection pull-down menu 102 used to select one input device from all available devices, a directory text display box 104 displaying the name of the currently selected directory on the selected input device, and a browse button 106 which, when selected, provides typical GUI directory navigation of the selected input device. A text filter box 108 is provided in which a filter may be specified to restrict filenames 110 displayed in filename list box 112 to those matching the filter specification. With each filename 110, a corresponding size 114 is displayed. The filenames and sizes are displayed in a filename column 116 and a size column 118 respectively. Once a filename 110 has been hi-lighted, an apply button 120 may be selected to load the corresponding file from the selected input device. The file will contain a plurality of profiles 28 which will, after loading, be available in color profile list window 22. The above described action may be performed repeatedly to load multiple profile data files 110. Selecting a Close button 122 will close the load profile data dialog 100.

Figure 5:
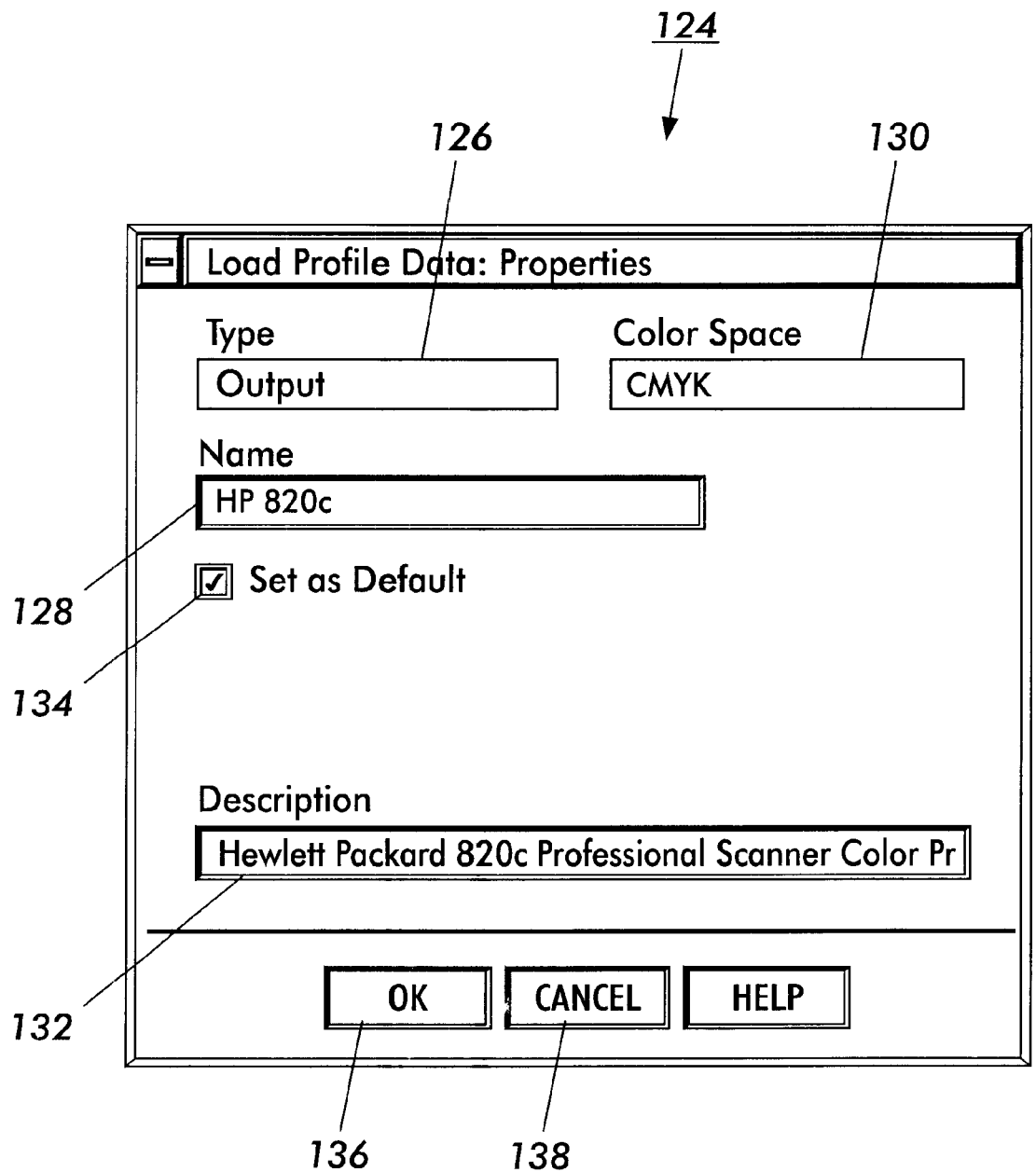
FIG. 5 illustrates a load profile data properties dialog.

Each time the apply button 120 is selected, a load profile data properties dialog 124 as shown in FIG. 5 will be activated for each profile associated with the selected filename 110. The dialog 124 will include a text display 126 of the profile type 44, a text display 128 of the symbolic name 40, a text display 130 of the color space 48, a text display 132 of the description 52 and a flip-flop check box 134 to optionally make the profile name shown in box 128 the new default profile displayed in box 54. Selecting an OK button 136 serves to approve the profile for loading. Selecting a Cancel button 138 cancels the loading of the profile named in box 128. In this way, individual profiles 28 discovered in the file corresponding the filename 110 can be selected and loaded, as opposed to all profiles 28 contained in the file.

Figure 6:
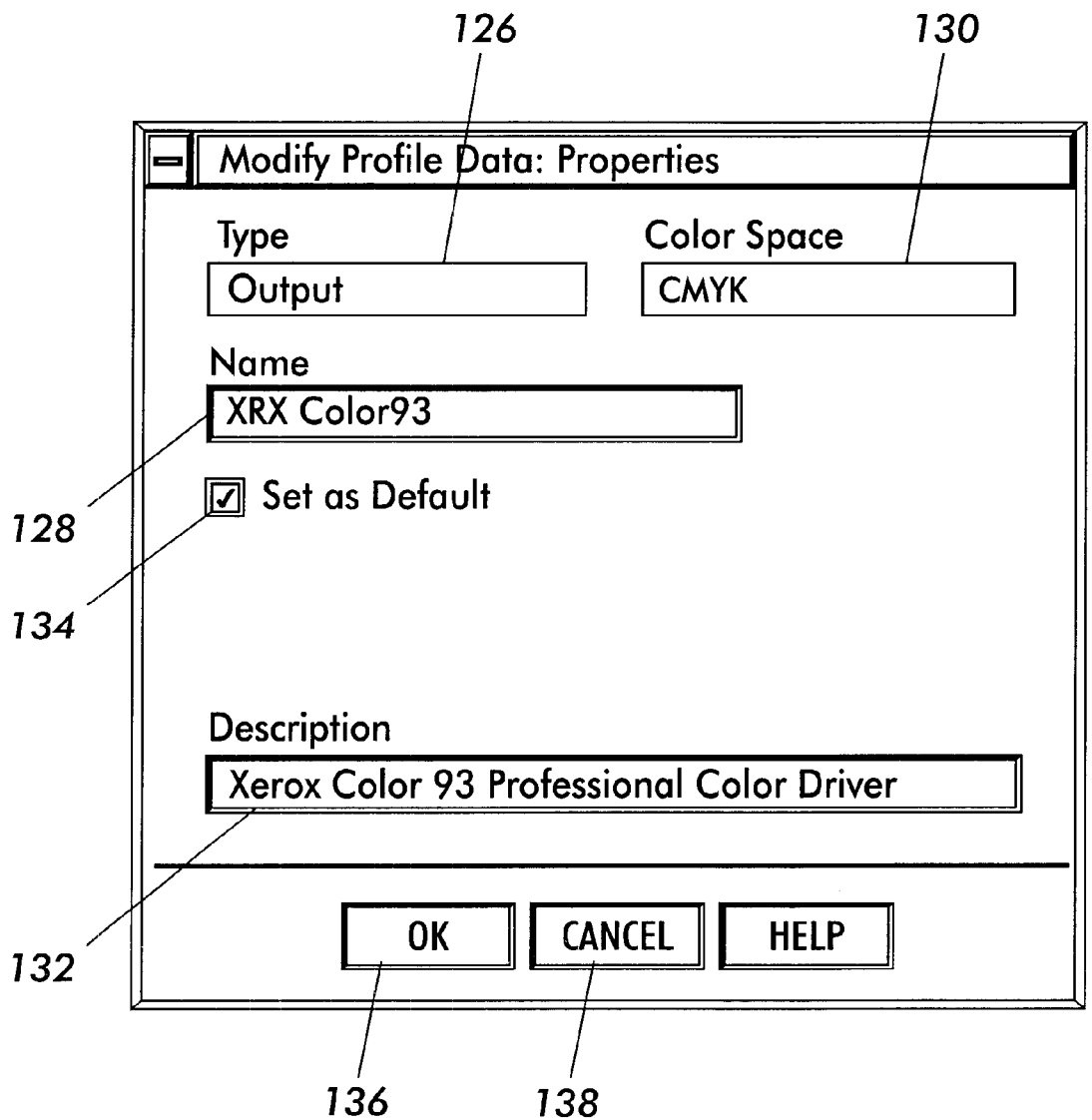
FIG. 6 illustrates a modify profile data properties dialog.

With reference now to FIG. 6, and continuing reference to FIG. 2, another aspect of navigation with respect to the modify properties dialog selection button 62 is explained. When the modify properties dialog selection button 62 is selected, a modify profile data properties dialog window 140 is opened. The dialog window 140 is similar to the load profile dialog box 100 and will likewise include the text display 126 of the profile type 44, the text display 128 of the symbolic name 40, the text display 130 of the color space 48, the text display 132 of the description 52 and the flip-flop check box 134 to optionally make the profile name shown in box 128 the new default profile displayed in box 54. Selecting the OK button 136 serves to approve the modified profile properties. Selecting the Cancel button 138 cancels any modifications of the profile named in box 128.

Figure 7:
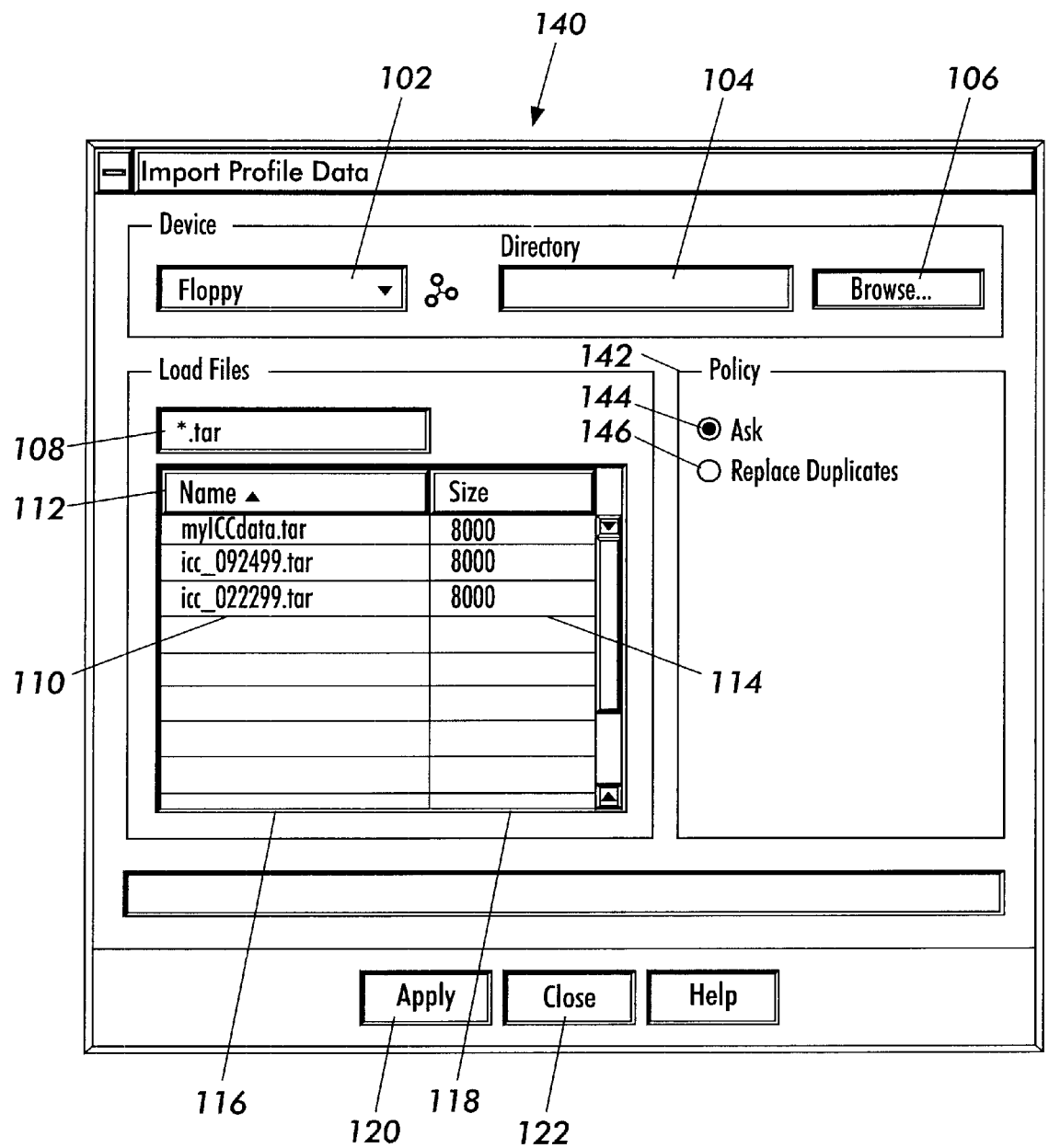
FIG. 7 illustrates an import profile data dialog.

With reference now to FIG. 7, and continuing reference to FIGS. 2 and 4, still another aspect of navigation with respect to the import dialog selection button 72 is explained. When the import dialog selection button 72 is selected, an import profile data dialog window 140 is opened. Within dialog window 140 is an input device selection pull-down menu 102 used to select one input device from all available devices, a directory text display box 104 displaying the name of the currently selected directory on the selected input device, and a browse button 106 which, when selected, provides typical GUI directory navigation of the selected input device. A text filter box 108 is provided in which a filter may be specified to restrict filenames 110 displayed in filename list box 112 to those matching the filter specification. With each filename 110, a corresponding size 114 is displayed. The filenames and sizes are displayed in a filename column 116 and a size column 118 respectively. Once a filename 110 has been hi-lighted, an apply button 120 may be selected to import the corresponding file from the selected input device. The file will contain a plurality of profiles 28 which will, after importing, be available in color profile list window 22. A key difference between the load profile data dialog box 100 and the import profile data dialog window 140 is that whereas the load dialog activates a load profile data properties dialog 124 for each profile, permitting a per profile name and description modification and approval, the import dialog loads all profiles discovered in the selected input file as is unless a symbolic name 40 is duplicated in which case policy 142 is invoked. Policy 142 includes two radio buttons 144 and 146, wherein the first button: 144 selects an ask option, permitting the user to approve replacing a profile with a duplicate symbolic name 40, and the second button 146 provides the option of replacing any duplicated symbolic name 40 without asking the user. The above described action may be performed repeatedly to import multiple profile data files 110. Selecting a Close button 122 will close the import profile data dialog 140.

Figure 8:
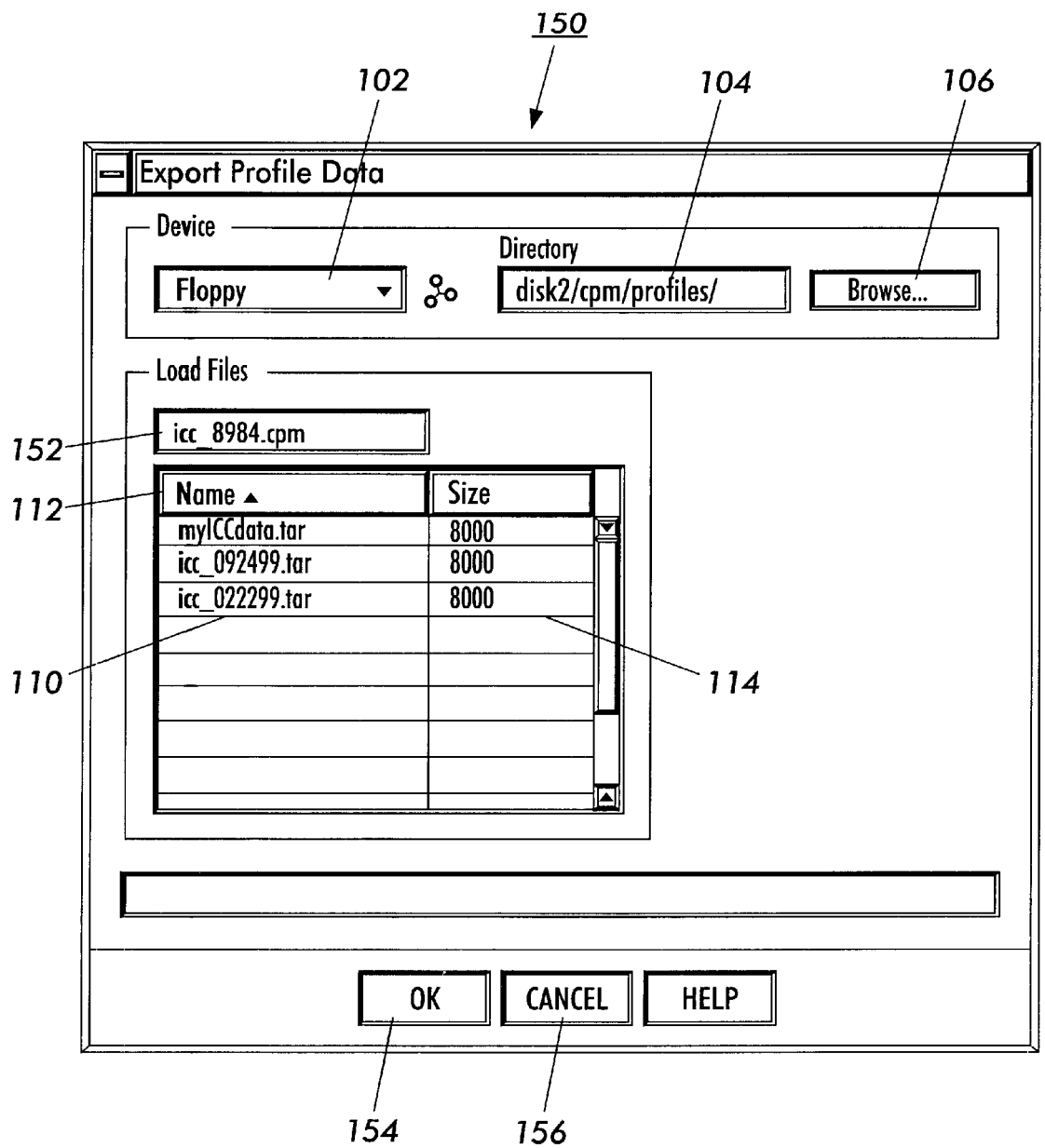
FIG. 8 illustrates an export profile data dialog.

With reference now to FIG. 8, and continuing reference to FIGS. 2 and 7, another aspect of navigation similar to, but the opposite of, the import dialog selection button 72 is explained. To export one or more profiles 28 to an output file on a selected output device, the user must first hi-light all profiles 28 in profile list 30 that are to be exported. After hi-lighting selected profiles 28, the export dialog selection button 68 is selected, and an export profile data dialog window 150 is opened. Within dialog window 150 is an output device selection pull-down menu 102 used to select one output device from all available devices, a directory text display box 104 displaying the name of the currently selected directory on the selected output device, and a browse button 106 which, when selected, provides typical GUI directory navigation of the selected input device. A modifiable text filename box 152 is provided in which an output filename must be specified. Filenames 110 displayed in filename list box 112 are filenames already existing on the output device in the selected directory. With each filename 110 a corresponding size 114 is displayed. The filenames and sizes are displayed in a filename column 116 and a size column 118 respectively. Once a filename has been provided in filename box 152, an OK button 154 may be selected to export the previously hi-lighted profiles 28 to the selected output device with the filename provided in box 152. Selecting a Cancel button 156 will close the export profile data dialog 150 without exporting any profiles 28.

Figure 9:
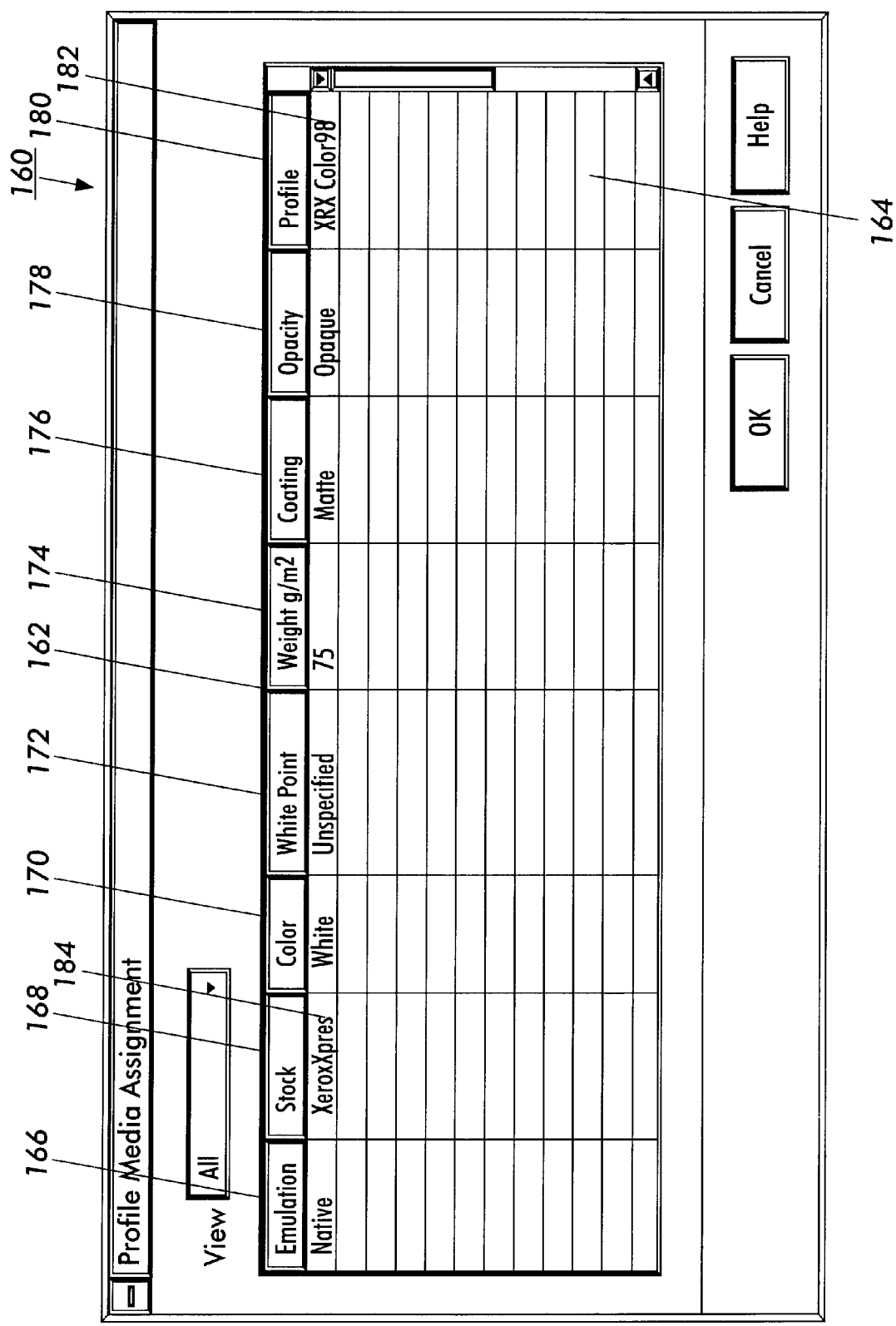
FIG. 9 illustrates a profile to media assignment dialog.

With reference now to FIG. 9, and with continuing reference to FIG. 2, the profile-to-media button 58, when selected, opens a profile to media assignment dialog window 160 that facilitates assigning each profile 28 to at least one media type in a one-to-many relationship. This feature of the present invention enables the use of one profile 28 specification for all media types that work well with said specification. In prior art color management methods, a profile would be defined for each media type, producing many redundant profiles.

Dialog 160 includes a list display 162 showing existing profile assignments where each row in list display 162 corresponds to one profile to media assignment 164. List display 162 is a columnar display including columns for emulation 166, stock name 168, stock color 170, stock white point 172, stock weight 174, stock coating 176 and stock opacity 178 which comprise the data elements for one media type, in the present embodiment. It is to be understood that other systems may be designed which use all or some subgroup of these elements. List display 162 further includes a profile column 180 for the profile symbolic name 40 to which said media type is being assigned. In the exemplary assignment in FIG. 9, profile symbolic name XRX.Color98 182 is assigned to stock name XeroxXpres 184 which has, of course, the corresponding data elements shown in the remaining columns of list display 162.

Figure 10:
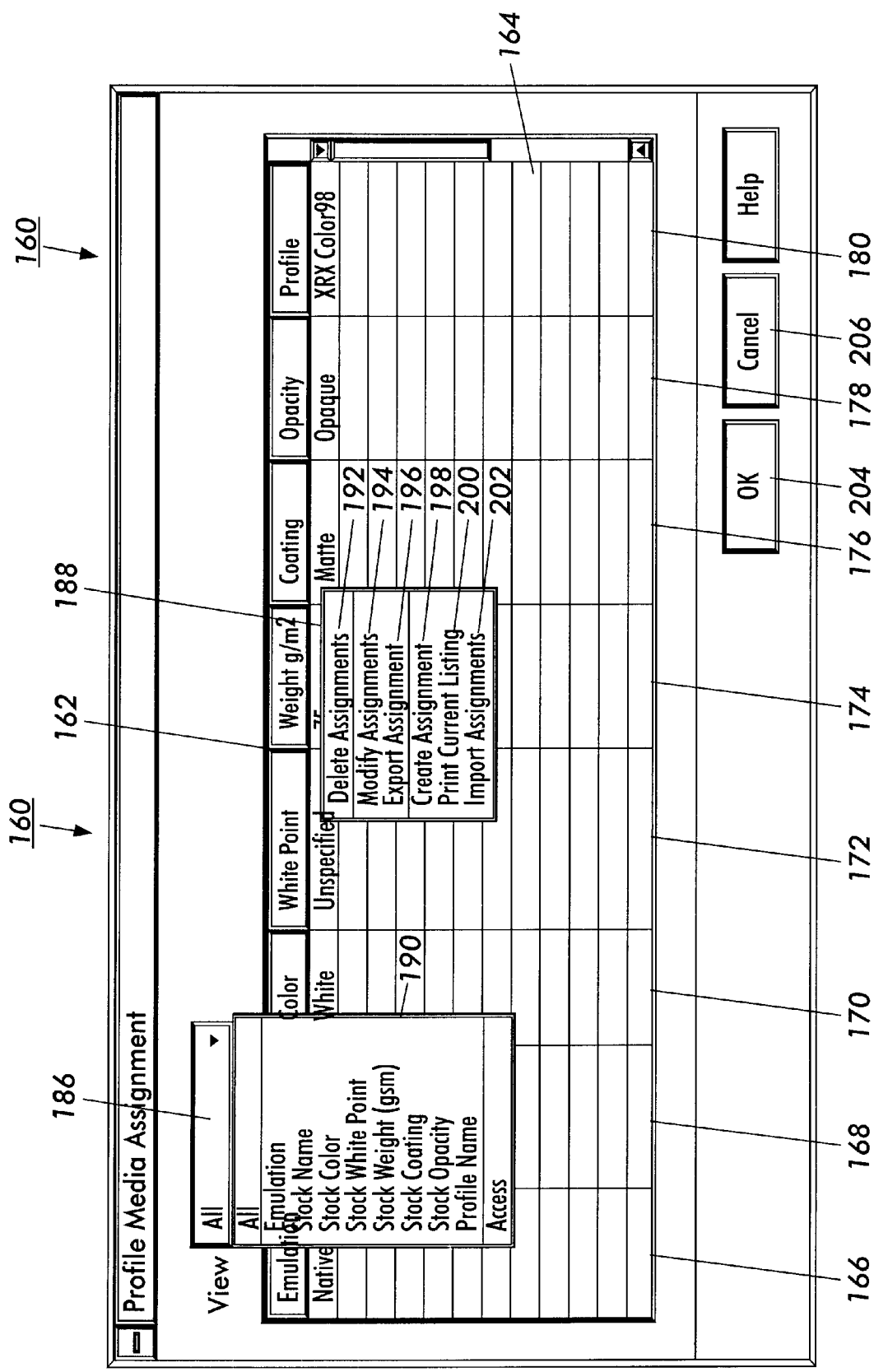
FIG. 10 illustrates the profile to media assignment dialog of FIG. 9 with an open view menu and an open right mouse click menu.

Referring now to FIG. 10 with continuing reference to FIG. 9, profile to media assignment dialog 160 further includes a pull-down view menu 186 and a pull-down or right mouse button menu 188. Selecting pull-down menu 186 causes a list of available filters 190 to be displayed. Selecting one of the displayed filters will cause list display 162 to only show those assignments 164 that satisfy the filter criteria. Exemplary filters include, but are not limited to: a filter causing all assignments to be displayed, a filter to display only emulation profile assignments, a filter to display only specific stock name profile assignments, a filter to display only specific stock color profile assignments, a filter to display only specific stock white point profile assignments, a filter to display only specific stock weight profile assignments, a filter to display only specific stock coating profile assignments, a filter to display only specific stock opacity profile assignments, and a filter to display only access profile assignments.

The right mouse button menu 188 will be displayed after clicking the right mouse button. Menu 188 includes selection buttons allowing the user to delete assignments 192, modify assignments 194, export assignments 196, create assignments 198, print the current listing 200 and import assignments 202. Buttons 192, 194 and 196 require that at least one profile assignment 164 be hi-lighted before selecting the appropriate button.

The profile to media assignment dialog 160 also includes an OK button 204 that is used to confirm user acceptance of the profile to media assignments 164 displayed in the list display 162 and close the profile to media assignment dialog 160. If the user wishes to cancel modifications, deletions and creations of profile to media assignments 164 shown in list display 162, a Cancel button 206 is provided for that purpose. Cancel button 206 will close the profile to media assignment dialog 160 without permanently updating the profile to media assignments 164.

Figure 11:
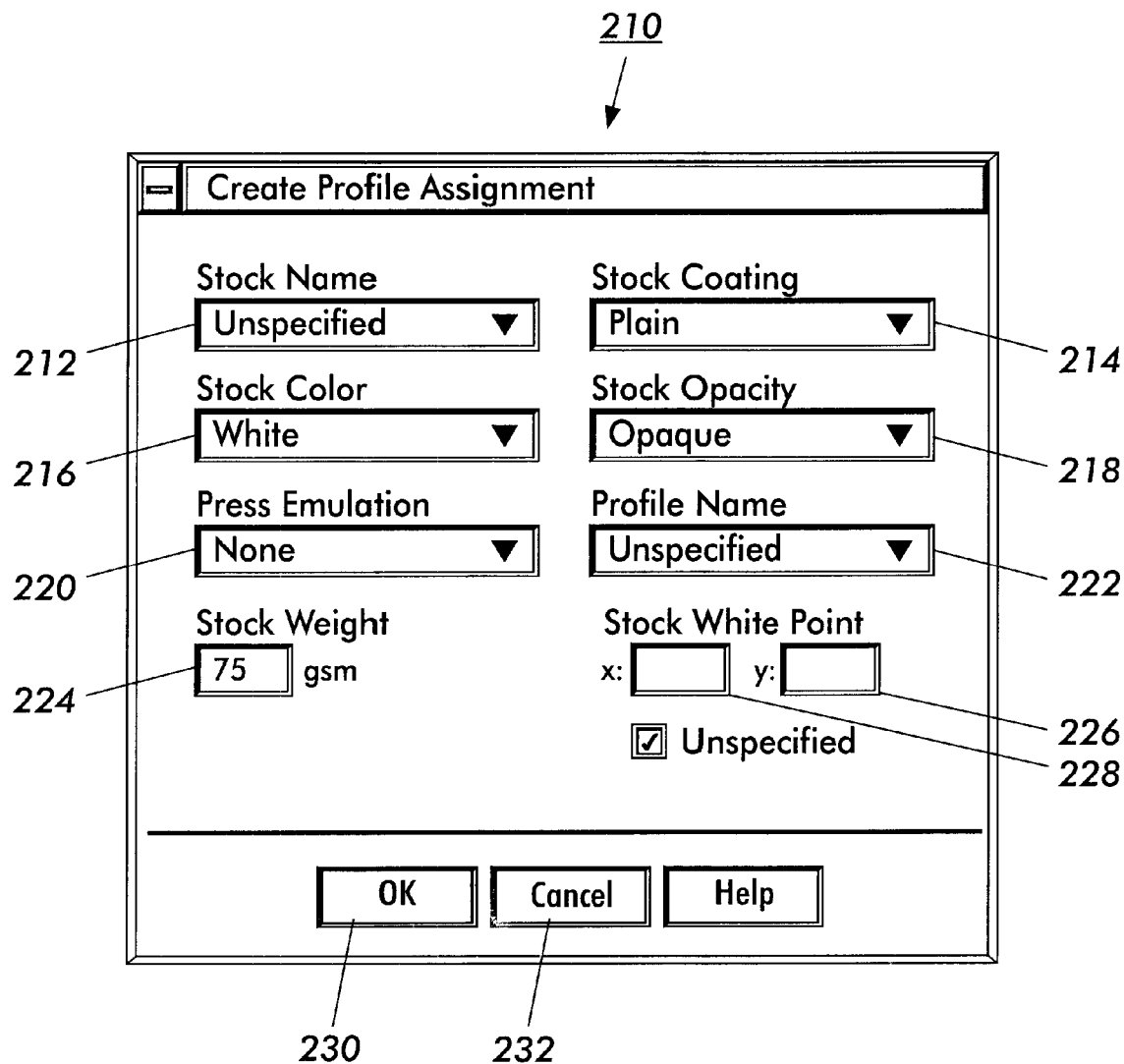
FIG. 11 illustrates a create profile assignment dialog.

A navigational aspect of the present invention with respect to creating a profile to media assignment will now be described with reference to FIG. 11 and continuing reference to FIGS. 2 and 10. Selecting the create assignments 198 option in right mouse button menu 188 will open the create profile assignment dialog 210. Dialog 210 includes the following pull-down menus: stock name 212, stock coating 214, stock color 216, stock opacity 218, press emulation 220 and profile name 222. Dialog 210 further comprises the following modifiable text boxes: stock weight 224, stock white point x value 226 and stock white point y value 228. Pull-down menus 212, 214, 216, 218 and 220, along with boxes 224, 226 and 228, provide the necessary media data to which a profile symbolic name 40 can be assigned. The appropriate symbolic name can be selected from pull-down menu 222. Upon making the above described selections and entries, the user may select an OK button 230 to accept the new profile to media assignment and have it added to list display 162 upon closing the create profile assignment dialog 210, or the user may select a Cancel button 232, to cancel the creation of a new profile to media assignment and close the create profile assignment dialog 210.

Figure 12:
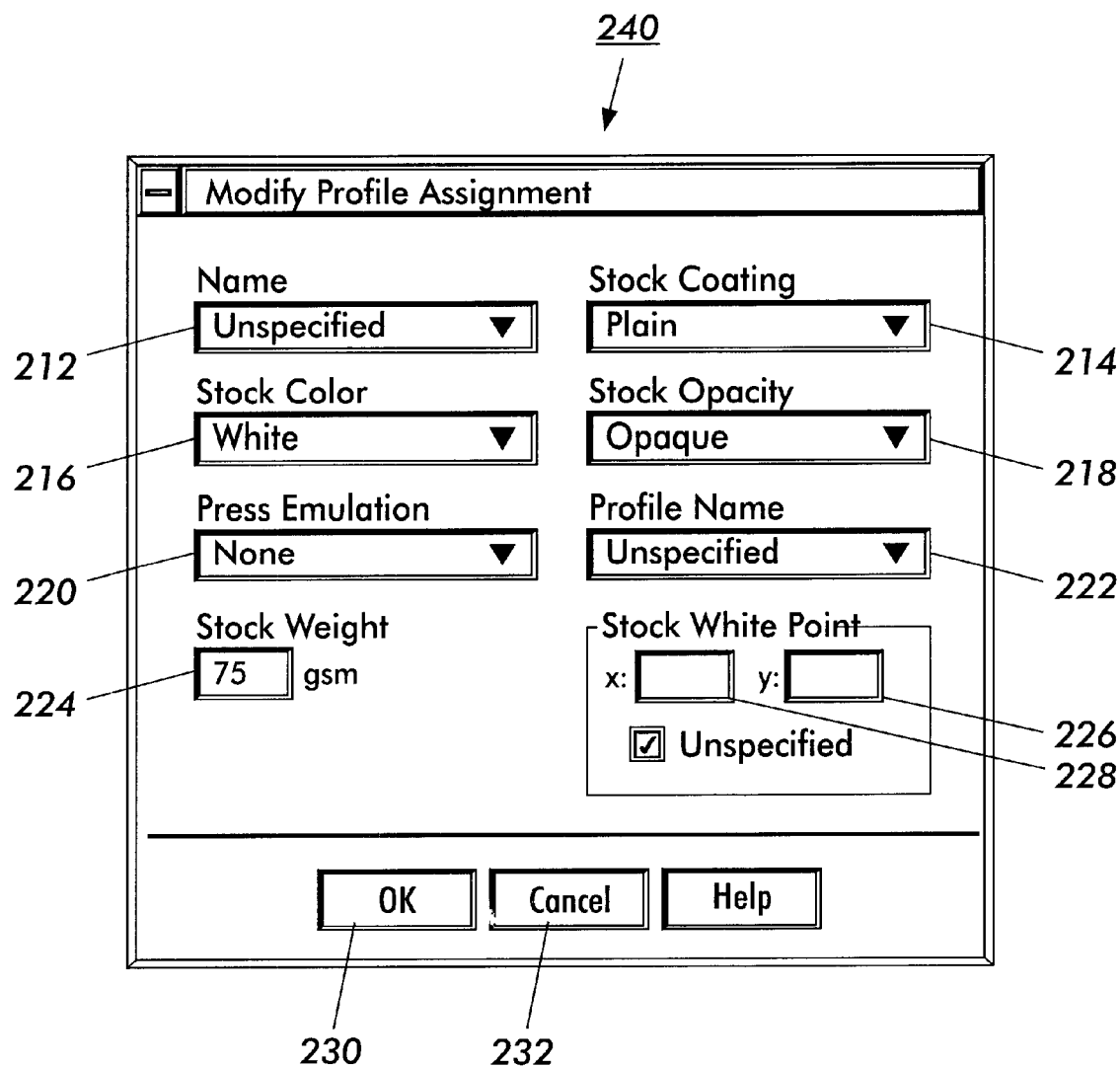
FIG. 12 illustrates a modify profile assignment dialog.

Another navigational aspect of the present invention with respect to modifying a profile to media assignment will now be described with reference to FIG. 12 and continuing reference to FIGS. 2, 10 and 11. Selecting the modify assignments 194 option in right mouse button menu 188 will open the modify profile assignment dialog 240. Dialog 240 comprises the same elements as the create profile assignments dialog 210, namely pull-down menus stock name 212, stock coating 214, stock color 216, stock opacity 218, press emulation 220 and profile name 222, and modifiable text boxes: stock weight 224, stock white point x value 226 and stock white point y value 228. Pull-down menus 212, 214, 216, 218, 220 and 222, along with boxes 224, 226 and 228, will initially display the media data and profile symbolic name 40 corresponding to the previously hi-lighted profile to media assignment 164. Any of the above listed data can be modified and, the user may then select an OK button 230 to accept the modified profile to media assignment and have the list display 162 updated upon closing the modify profile assignment dialog 240, or the user may select a Cancel button 232, to cancel the modification of a profile to media assignment and close the modify profile assignment dialog 240.

Figure 13:
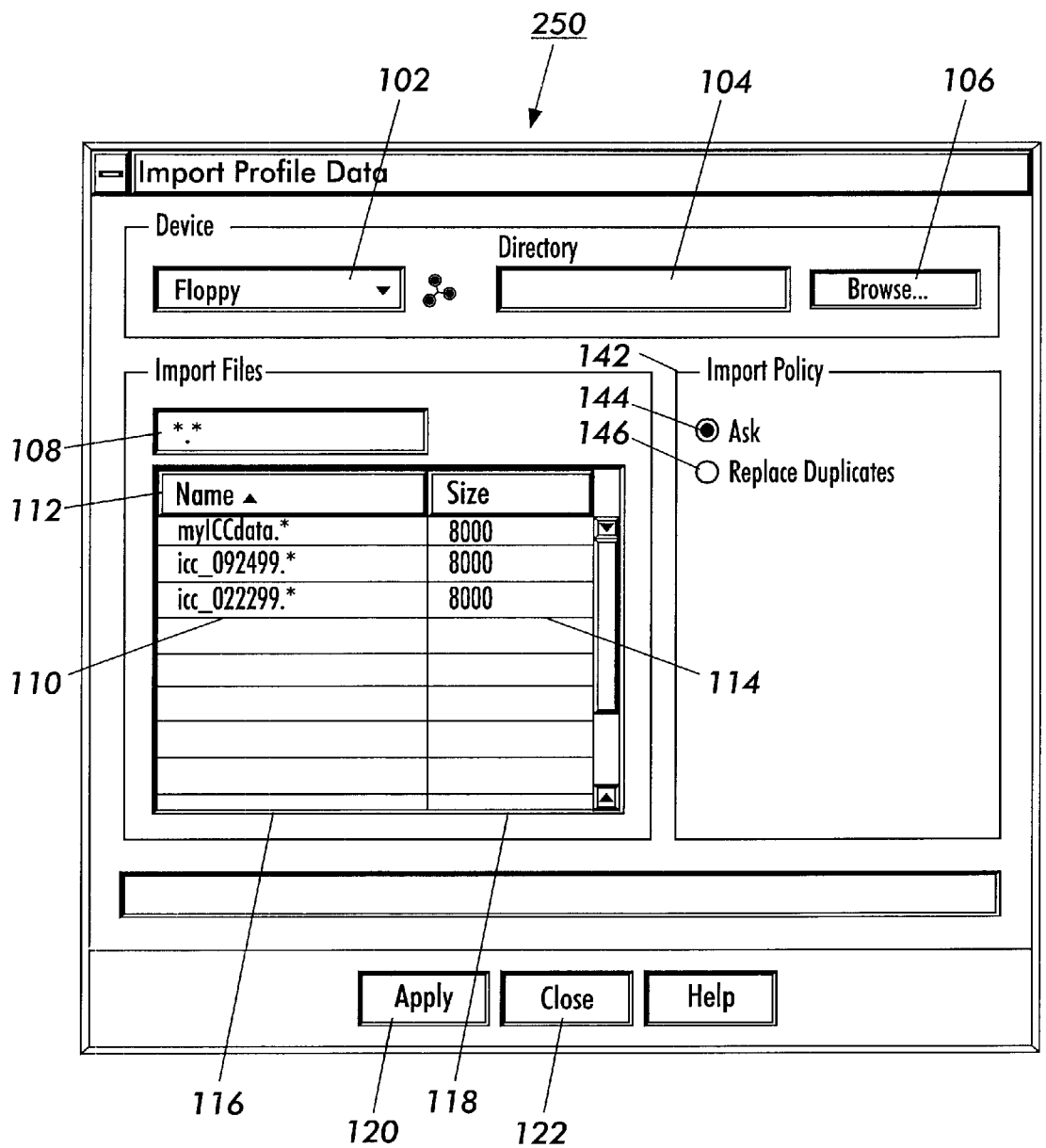
FIG. 13 illustrates an import profile assignment dialog.

Just as color profiles 28 can be exported and imported, so too can profile to media assignments 164. With reference now to FIG. 13, and continuing reference to FIGS. 7 and 10, another navigational aspect of the present invention with respect to importing profile assignments will be described. Selecting the import assignments 202 option in right mouse button menu 188 will open the import profile assignment dialog 250. Within dialog 250 is an input device selection pull-down menu 102 used to select one input device from all available devices, a directory text display box 104 displaying the name of the currently selected directory on the selected input device, and a browse button 106 which, when selected, provides typical GUI directory navigation of the selected input device. A text filter box 108 is provided in which a filter may be specified to restrict filenames 110 displayed in filename list box 112 to those matching the filter specification. With each filename 110, a corresponding size 114 is displayed. The filenames and sizes are displayed in a filename column 116 and a size column 118 respectively. Once a filename 110 has been hi-lighted, an apply button 120 may be selected to import the corresponding file from the selected input device. The file will contain a plurality of profile to media assignments 164 which will, after importing, be available in list display 162. Policy 142 includes two radial buttons 144 and 146 wherein the first button 144 selects an ask option, permitting the user to approve replacing a duplicate profile 164 when one is encountered on the input file, and the second button 146 provides the option of replacing any duplicated profiles 164 without asking the user. The above described action may be performed repeatedly to import multiple profile to media assignment files 110. Selecting a Close button 122 will close the import profile assignment dialog 250.

Figure 14:
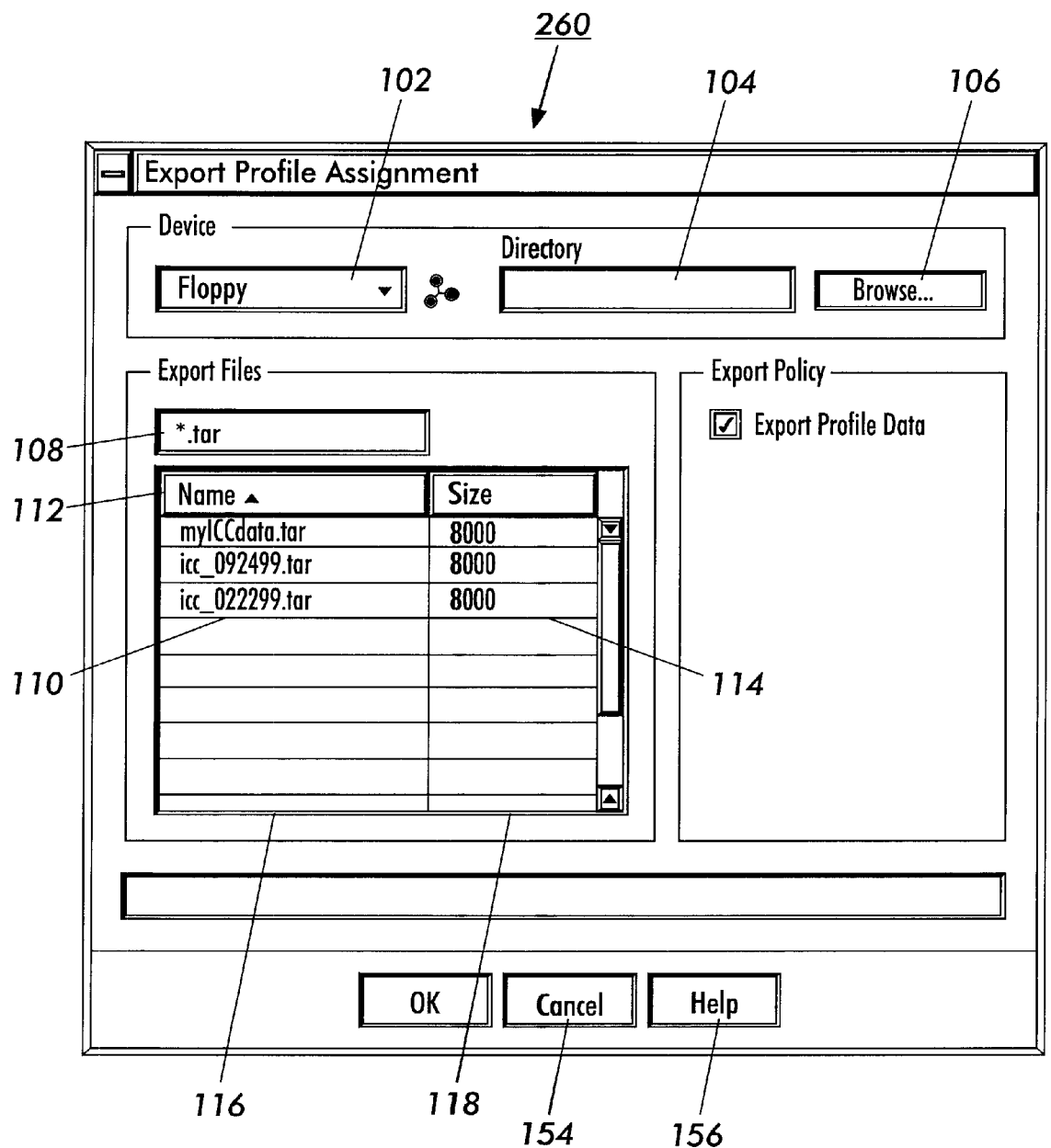
FIG. 14 illustrates an export profile assignment dialog.

With reference now to FIG. 14, and continuing reference to FIGS. 8 and 10, a navigational aspect of the present invention with respect to exporting profile assignments will be described. Selecting the export assignments 196 option in right mouse button menu 188 will open the export profile assignment dialog 260. To export one or more profile assignments 164 to an output file on a selected output device, the user must first hi-light all profile to media assignments 164 in display list 162 that are to be exported. After hi-lighting selected assignments 164, the export assignments 196 option is selected, and an export profile data dialog 260 window is opened. Within dialog 260 is an output device selection pull-down menu 102 used to select one output device from all available devices, a directory text display box 104 displaying the name of the currently selected directory on the selected output device, and a browse button 106 which, when selected, provides typical GUI directory navigation of the selected input device. A modifiable text filename box 152 is provided in which an output filename must be specified. Filenames 110 displayed in filename list box 112 are filenames already existing on the output device in the selected directory. With each filename 110, a corresponding size 114 is displayed. The filenames and sizes are displayed in a filename column 116 and a size column 118 respectively. Once a filename has been provided in filename box 152, an OK button 154 may be selected to export the previously hi-lighted profile to media assignments 164 to the selected output device with the filename provided in box 152. Selecting a Cancel button 156 will close the export profile assignment dialog 260 without exporting any assignments 164.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

What is claimed is:

1. A color manager high level navigation system comprising:
 a graphical user interface;
 a color manager selection icon at the highest navigation level of the graphical user interface; and,
 a color manager having a view menu, a characterization tool icon for activating a profile characterization tool and a profile list window further comprising:
  a list of available profiles matching a filter criteria selected from the view menu;
  a text display box displaying a current default output profile identified by a symbolic name;
  a message box for displaying confirmation of recent actions; and,
  a profile to media button for activating a profile to media assignment dialog.

2. The system as set forth in claim 1 wherein the view menu comprises at least one of:
 a filter that causes all available profiles to be displayed;
 a filter that causes only destination profiles to be displayed;
 a filter that causes only source profiles to be displayed;
 a filter that causes only device gray source profiles to be displayed;
 a filter that causes only device RGB source profiles to be displayed;
 a filter that causes only device CMY source profiles to be displayed; and,
 a filter that causes only device CMYK source profiles to be displayed.

3. The system as set forth in claim 1 further comprising a mouse button menu that is activated for a currently hi-lighted profile object in the profile list.

4. The system as set forth in claim 3 wherein the right mouse button menu comprises a list of functions that can be performed, further comprising at least one of:
- a modify function for the currently hi-lighted profile;
- a replace function for the currently hi-lighted profile;
- a delete function for the currently hi-lighted profile;
- an export function for the currently hi-lighted profile;
- a load function to read a profile from an input device;
- an import function to read multiple profiles from an input device;
- a print current view function; and,
- a save current view function.

5. The system as set forth in claim 1 wherein the profile list further comprises:
- a column displaying an icon for each profile that is characterized as a system profile that cannot be deleted or modified;
- a column displaying the symbolic name of each profile;
- a column displaying a type for each profile including, but not limited to, input and output;
- a column displaying a color space for each profile including, but not limited to, gray, RGB, CMY and CMYK; and,
- a column displaying a description of each profile.

6. A color manager high level navigation system comprising:
- a graphical user interface;
- a color manager selection icon at the highest navigation level of the graphical user interface; and,
- a color manager further comprising:
  - a view menu including:
    - a filter selection that causes all available profiles to be displayed;
    - a filter selection that causes only destination profiles to be displayed;
    - a filter selection that causes only source profiles to be displayed;
    - a filter selection that causes only device gray source profiles to be displayed;
    - a filter selection that causes only device RGB source profiles to be displayed;
    - a filter selection that causes only device CMY source profiles to be displayed; and,
    - a filter selection that causes only device CMYK source profiles to be displayed;
  - a characterization tool icon for activating a profile characterization tool; and,
  - a profile list window further comprising:
    - a list of available profiles matching a filter criteria selected from the view menu further comprising:
      - a column displaying an icon for each profile that is characterized as a system profile that cannot be deleted or modified;
      - a column displaying a symbolic name of each profile;
      - a column displaying a type for each profile including, but not limited to, input and output;
      - a column displaying a color space for each profile including, but not limited to, gray, RGB, CMY and CMYK; and,
      - a column displaying a description of each profile;
    - a text display box displaying a current default output profile symbolic name;
    - a message box for displaying confirmation of recent actions; and,
    - a profile to media button for activating a profile to media assignment dialog.

7. The system as set forth in claim 6 further comprising a mouse button menu that is activated for a currently hi-lighted profile object in the profile list.

8. The system as set forth in claim 7 wherein the mouse button menu comprises at least one of:
- modify properties dialog selection button for the currently hi-lighted profile;
- a replace dialog selection button for the currently hi-lighted profile;
- a delete selection button for the currently hi-lighted profile;
- an export dialog selection button for the currently hi-lighted profile;
- a load dialog selection button to read a profile from an input device;
- an import dialog selection button to read multiple profiles from an input device;
- a print current view selection button; and,
- a save current view selection button.

9. The system as set forth in claim 8 wherein the modify properties dialog comprises a properties dialog window further comprising:
- a modifiable text display box showing the symbolic name of the profile being modified;
- a flip-flop check box indicating whether the profile being modified is to be set as the default profile;
- a text display box showing the type of the profile to be modified;
- a text display box showing the color space of the profile to be modified; and,
- a modifiable text display box showing the description of the profile to be modified.

10. The system as set forth in claim 8 wherein the replace dialog comprises:
- a display of profiles compatible with the previously hi-lighted profile in the profile list further including,
  - a column containing the symbolic names of compatible profiles and an icon for each symbolic name indicating profiles that cannot be changed;
  - a column containing the profile type indicator of each profile;
  - a column indicating the color space of each profile; and,
  - a column displaying a description of each profile;
- a text display box showing the symbolic name of the profile to be replaced; and,
- a status message to display progress information.

11. The system as set forth in claim 8 wherein the export dialog comprises:
- an output device selection pull-down menu;
- a directory text display box;
- a browse button for activating a device browsing dialog;
- a text box for providing an output filename; and,
- a list of available profile data files in the selected directory on the selected output device further comprising:
  - a column displaying the filename of each profile data file; and,
  - a column displaying the size of each profile data file.

12. The system as set forth in claim 8 wherein the load dialog comprises:

an input device selection pull-down menu;

a directory text display box;

a browse button for activating a device browsing dialog;

a text filter box for providing an input device filename filter; and, a list of available profile data files in the selected directory on the selected input device further comprising:
 a column displaying the filename of each profile data file; and,
 a column displaying the size of each profile data file.

13. The system as set forth in claim 12 further comprising a load profile data properties dialog comprising:

a modifiable text display box showing the symbolic name of the profile being loaded;

a flip-flop check box indicating whether the profile being loaded is to be set as the default profile;

a text display box showing the type of the profile being loaded;

a text display box showing the color space of the profile being loaded; and, a modifiable text display box showing the description of the profile being loaded.

14. The system as set forth in claim 8 wherein the import dialog comprises:

an input device selection pull-down menu;

a directory text display box;

a browse button for activating a device browsing dialog;

a text filter box for providing an input device filename filter;

a list of available profile data files in the selected directory on the selected input device further comprising:
 a column displaying the filename of each profile data file; and,
 a column displaying the size of each profile data file;

a status message to display status information for loaded profiles; and, an import policy group box containing selectable, mutually exclusive buttons wherein the first of said selectable buttons indicates that a duplicate file should not be replaced without asking, and the second of said selectable buttons indicates that duplicate files are to always be replaced.

15. The system as set forth in claim 6 wherein the profile to media assignment dialog comprises:

an assignment view menu including any of, but not limited to:
 a filter selection that causes all profile assignments to be displayed;
 a filter selection that causes only emulation profile assignments to be displayed;
 a filter selection that causes only specific stock name profile assignments to be displayed;
 a filter selection that causes only specific stock color profile assignments to be displayed;
 a filter selection that causes only specific stock white point profile assignments to be displayed;
 a filter selection that causes only specific stock weight profile assignments to be displayed;
 a filter selection that causes only specific stock coating profile assignments to be displayed;
 a filter selection that causes only specific stock opacity profile assignments to be displayed; and,
 a filter selection that causes only access profile assignments to be displayed; and, a profile to media assignment list box further comprising:
 a list of available profile to media assignments matching a filter criteria selected from the assignment view menu further comprising:
  a column displaying an emulation type for each profile to media assignment;
  a column displaying a stock name for each profile to media assignment;
  a column displaying a color for each profile to media assignment;
  a column displaying a white point for each profile to media assignment;
  a column displaying a weight for each profile to media assignment;
  a column displaying a coating for each profile to media assignment;
  a column displaying a opacity for each profile to media assignment; and,
  a column displaying the symbolic name of the assigned profile; and,
 a right mouse button assignment menu providing assignment functions for the currently highlighted row in the list of available profile to media assignments further comprising:
  a delete assignment dialog activation;
  a modify assignment dialog activation;
  an export assignment dialog activation;
  a create assignment dialog activation;
  a print current assignment listing activation; and,
  an import assignment dialog activation.

16. The system as set forth in claim 15 wherein the create assignment dialog comprises:

a stock name selection pull-down menu;

a stock color selection pull-down menu;

a press emulation selection pull-down menu;

a stock coating selection pull-down menu;

a stock opacity selection pull-down menu;

a profile name selection pull-down menu;

a modifiable stock weight text box;

a modifiable stock white point, x direction, text box;

a modifiable stock white point, y direction, text box; and,
 a flip-flop check box checked if the stock white point is unspecified.

17. The system as set forth in claim 15 wherein the modify assignment dialog comprises:

a stock name selection pull-down menu;

a stock color selection pull-down menu;

a press emulation selection pull-down menu;

a stock coating selection pull-down menu;

a stock opacity selection pull-down menu;

a profile name selection pull-down menu;

a modifiable stock weight text box;

a modifiable stock white point, x direction, text box;

a modifiable stock white point, y direction, text box; and, a flip-flop check box checked if the stock white point is unspecified.

18. The system as set forth in claim 15 wherein the import assignment dialog comprises:

an input device selection pull-down menu;

a directory text display box;

a browse button for activating a device browsing dialog;

a text filter box for providing an input device filename filter;

a list of available profile assignment files in the selected directory on the selected input device further comprising:
- a column displaying the filename of each profile assignment file; and,
- a column displaying the size of each profile assignment file;
- a status message to display status information for loaded profile assignments; and,
- an import policy group box containing selectable, mutually exclusive buttons wherein the first of said selectable buttons indicates that a duplicate profile assignment file should not be replaced without asking, and the second of said selectable buttons indicates that duplicate profile assignment files are to always be replaced.

19. The system as set forth in claim 15 wherein the export assignment dialog comprises:
- an output device selection pull-down menu;
- a directory text display box;
- a browse button for activating a device browsing dialog;
- a text filename box for providing an output device filename;
- a list of available profile assignment files in the selected directory on the selected output device further comprising:
  - a column displaying the filename of each profile assignment file; and,
  - a column displaying the size of each profile assignment file;
- a status message to display status information for exported profile assignment files; and,
- an export policy flip-flop check box to be checked if the profile data is to be exported along with the profile to media assignment.

20. A method for managing colors with a high level navigation system comprising:
- displaying a graphical user interface;
- displaying a color manager icon at the highest navigation level of the graphical user interface; and,
- displaying options in the color manager providing a user with a choice of at least one of:
  - selecting an option in a view menu from at least one of:
    - selecting a filter selection that causes all available profiles to be displayed;
    - selecting a filter selection that causes only destination profiles to be displayed;
    - selecting a filter selection that causes only source profiles to be displayed;
    - selecting a filter selection that causes only device gray source profiles to be displayed;
    - selecting a filter selection that causes only device RGB source profiles to be displayed;
    - selecting a filter selection that causes only device CMY source profiles to be displayed; and,
    - selecting a filter selection that causes only device CMYK source profiles to be displayed;
  - selecting a characterization tool icon for activating a profile characterization tool; and,
  - selecting a profile list window further including the steps of:
    - displaying a list of available profiles matching a filter criteria selected from the view menu further displaying:
      - a column displaying an icon for each profile that is characterized as a system profile that cannot be deleted or modified;
      - a column displaying a symbolic name of each profile;
      - a column displaying a type for each profile including, but not limited to, input and output;
      - a column displaying a color space for each profile including, but not limited to, gray, RGB, CMY and CMYK; and,
      - a column displaying a description of each profile;
    - displaying a text display box showing a current default output profile symbolic name;
  - displaying a message box showing confirmation of recent actions; and,
  - displaying a profile to media button for activating a profile to media assignment dialog.

* * * * *